Nov. 29, 1966   D. D. MURPHY   3,288,272
CONVEYOR APPARATUS

Filed Nov. 27, 1964   2 Sheets-Sheet 1

INVENTOR.
DONALD D. MURPHY
BY
Edward W. Nypaver
his ATTORNEY

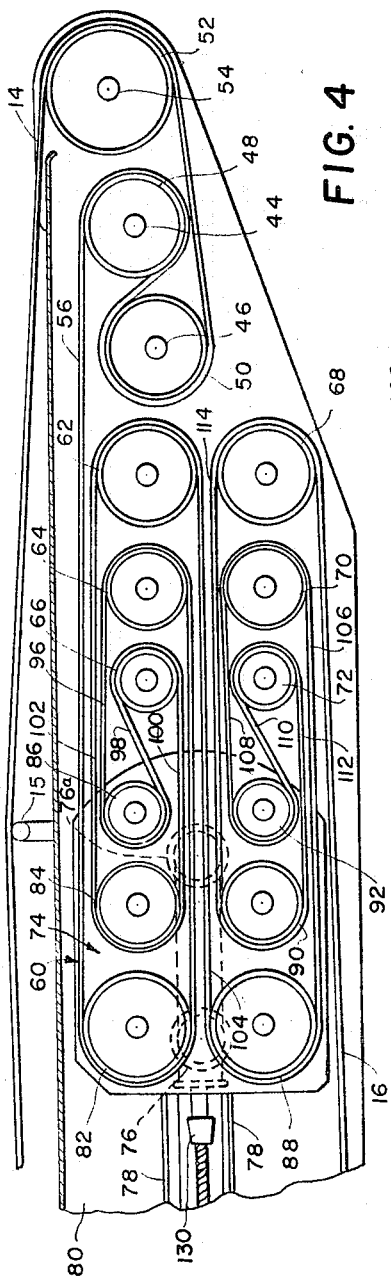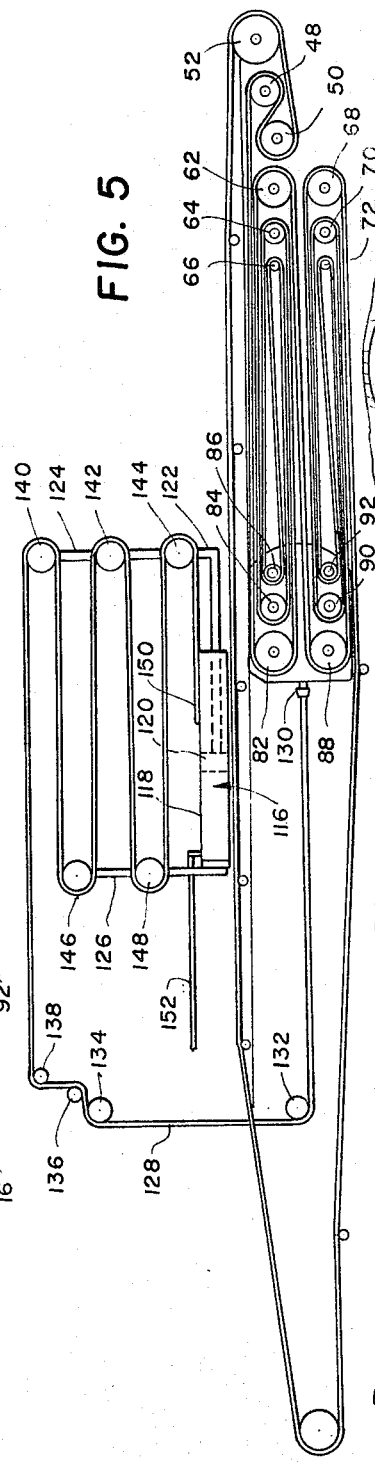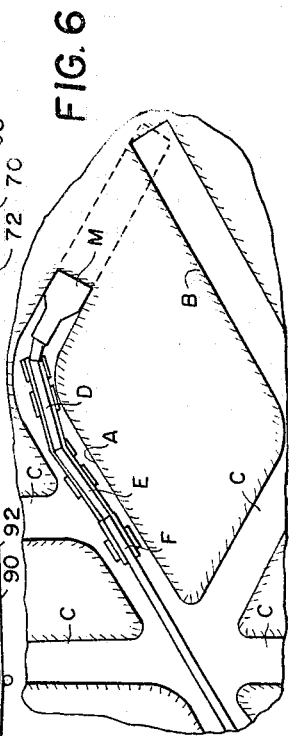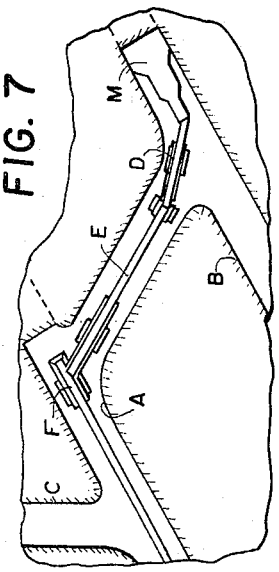

United States Patent Office 3,288,272
Patented Nov. 29, 1966

3,288,272
CONVEYOR APPARATUS
Donald D. Murphy, Franklin, Pa., assignor to Joy Manufacturing Company, Pittsburgh, Pa., a corporation of Pennsylvania
Filed Nov. 27, 1964, Ser. No. 414,383
13 Claims. (Cl. 198—139)

This invention relates to extensible belt conveyors and more particularly to a new and improved unitized extensible belt conveyor having means for carrying the tail unit on the drive unit to provide a portable conveyor and an improved means for storing and paying out relatively long lengths of belting.

In some operations of mining wherein a continuous miner is employed, it has been the general practice to utilize extensible belts. Although such devices have served the purpose, they have not been entirely satisfactory under all conditions of operation because they did not have the ability to extend around corners. By way of example, in block mining, a minimum of two sides of the block must be reached, and this distance may be as much as 100 feet per side of block.

Other methods have been tried, as for example, shuttle cars, special portable conveyors and systems of bridges and bridge carriers. The ultimate in tonnage cannot be reached with shuttle cars because of the loss in traveling time. In addition, the belt system must be of a large capacity to handle the large shuttle car loads with a minimum of delay. Maximum tonnage cannot be gained with bridge systems either due to the fact that they do not retract to a sufficiently short length and delay is encountered when getting them out of the way so that the miner can move to the next point of operation.

The extensible belt conveyor of the present invention as hereinafter described provides a solution to the above problem by utilizing a unitized portable extensible belt conveyor in which the drive section is provided with means for carrying the tail or take-up section as a unitary portable conveyor. As a result, the unitized extensible belt can, while fully retracted, negotiate corners while performing its conveying function. Furthermore, the device of the present invention can be readily manipulated and efficiently moved from one location to another.

Accordingly, it is an object of the present invention to provide a new and improved extensible belt conveyor.

Another object of this invention is to provide a new and improved extensible belt conveyor having means for supporting and transporting the take-up buggy on the drive buggy.

It is a further object of the present invention to provide a new and improved extensible belt conveyor having means for storing large amounts of conveyor belt in a relatively small space and for requiring only a short pulley travel for such large amount of belt.

It is still a further object of the present invention to provide a new and improved extensible belt conveyor having means for storing all the belting required without having to add or remove belting during operation.

It is still another object of this invention to provide a new and improved method for handling and manipulating an extensible belt conveyor.

These and other objects of the present invention will become more apparent when taken in conjunction with the following detailed description and drawings in which:

FIG. 4 is an enlarged vertical central section through the front portion of a drive buggy incorporating the belt storing and paying out mechanism, the section being taken on the plane of the line 4—4 of FIG. 1;

FIG. 5 is a diagrammatic view of the belt storing and extension arrangement;

FIG. 6 is a plan view through a horizontal section of a mining area wherein a continuous miner, two unitized extensible belts of the present invention and one conventional extensible belt are employed; and FIG. 7 is a view similar to FIG. 6 with the miner in an advanced position.

Figure 1:
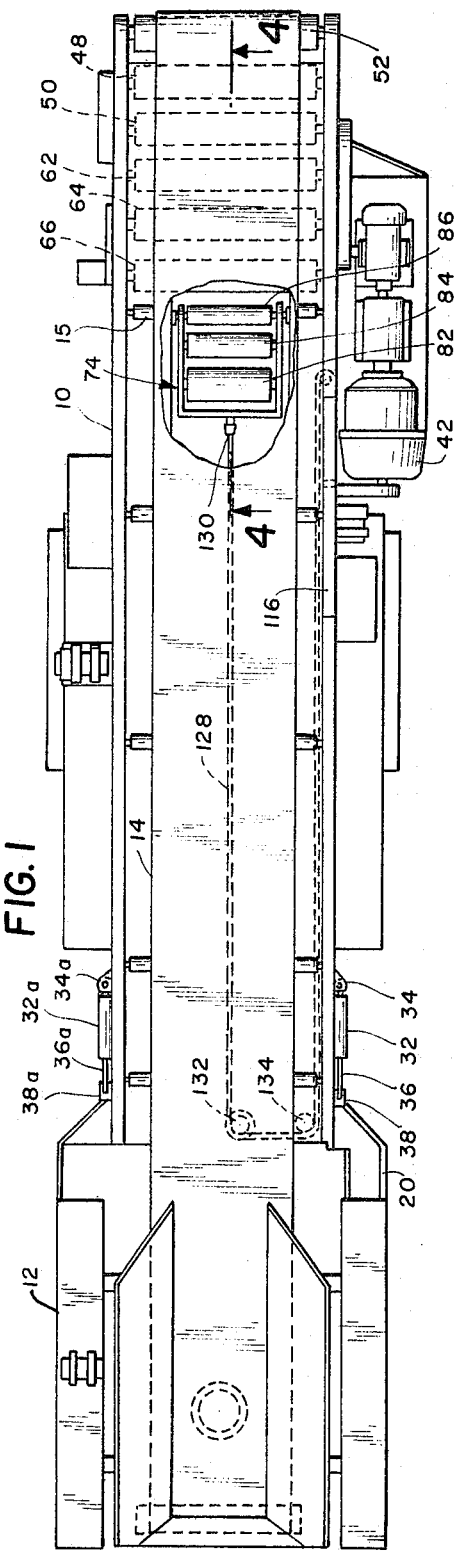
FIG. 1 is a plan view, with parts broken away of the unitized drive and take-up buggy mechanism of an extensible belt conveyor constructed in accordance with the principles of the present invention.

The improved extensible belt conveyor, as shown in the drawings, constitutes an improvement over an extensible belt conveyor of the kind described in Patent No. 2,893,539 to Baechli, assignor to the Joy Manufacturing Company of Pittsburgh, Pa. In view of the improvement character of the present invention, it is believed unnecessary to describe a great many of the details of the structure in which the improvement has been made, and reference may be had to the patent above referred to for such details.

Figure 2:
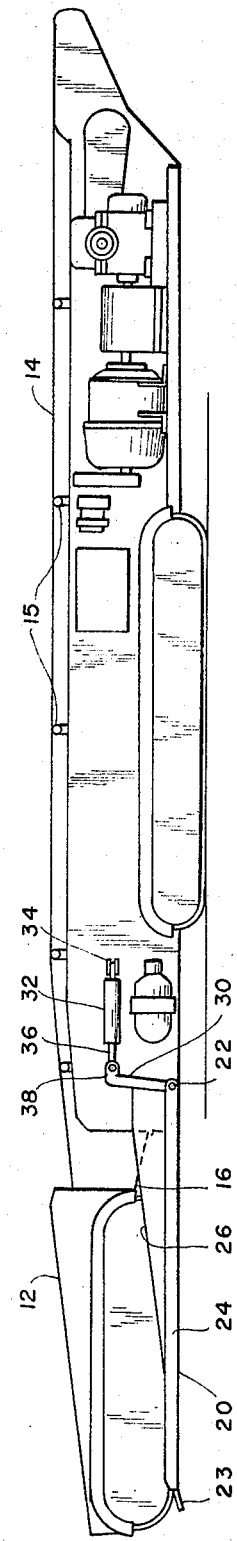
FIG. 2 is a side elevational view of the structure shown in FIG. 1.
Figure 3:
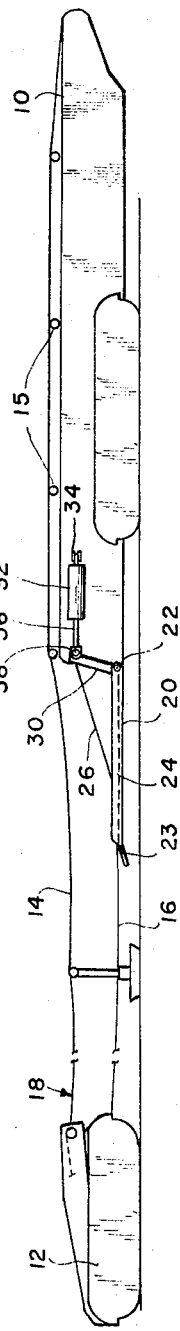
FIG. 3 is a diagrammatic view illustrating the unitized extensible belt conveyor in an extended position.

Referring now to the drawings and first to FIGS. 1, 2 and 3, it will be noted that a drive section or buggy 10 and a take-up buggy or section 12 are connected by the active run 14, which passes over a plurality of rollers 15, and return run 16 of a conveyor belt generally designated 18. The take-up buggy is adapted to follow closely behind a continuous miner as is well known in the art, and receive material discharged by the latter. It is believed unnecessary in this application to describe most of the details of construction of the drive buggy and tail buggy and reference for desired information with respect to such structure may be had by referring to the patent above mentioned. It may be said in passing, however, that both the drive buggy 10 and take-up buggy 12 are self-propelled. For purposes of this description, the forward end of the instant device will be the right hand side of such device as seen in FIGURES 1, 2 and 3.

For the purpose of supporting and carrying the take-up buggy, the drive buggy 10 is provided with a platform or ramp 20 extending axially rearwardly of said drive buggy and mounted for vertical swinging movement relative thereto about a pivot axis 22. Extending vertically upwardly from either side of the ramp 20 are flanges or side plates 24 having inclined portions 26 sloping upwardly, forwardly as seen in FIGURE 2. The rearward portion of ramp 20 is inclined rearwardly downwardly as at 23 to readily facilitate the ascent of the tail buggy thereon or the descent therefrom. A pair of elongated levers 30 extend substantially vertically upwardly from ramp 20 and are rigidly secured thereto as by means of welding, for example.

The ramp is swung about its pivot axis 22 by a pair of hydraulic jacks 32, 32a pivotably mounted at their casing ends at 34, 34a, respectively to the frame of the drive buggy, said jacks having piston rods 36, 36a, respectively extensible from said jacks and pivotably connected at 38, 38a to the levers 30. Normally, the ramp 20 will be retracted to a horizontal position as shown in FIGS. 2 and 3 to permit the ramp to clear itself of obstructions and irregularities on the mine floor. Fluid under pressure, however, is admitted to the head end of the hydraulic jack 32 for swinging the ramp downwardly when it is desired to receive or launch the tail buggy.

A suitable motor 42 mounted on the drive buggy 10 drive shafts 44 and 46 (FIG. 4) on which belt driving rolls 48 and 50, respectively, are mounted through suitable reduction gearing and drive connections. As such gearing and drive arrangements are conventional, and have been widely used in well known commercial structures by applicant's assignee, no further explanation or illustration is believed necessary.

The top run of the belt 14, after passing along the top of the drive buggy and over idlers 15, passes around a reversing roll 52 supported by a shaft 54 near the forward end of the drive buggy, and the belt 18 passes rearwardly from the lower side of the roll 52, up around the rearward side of the drive roll 50, forwardly and downwardly beneath the drive roll 48 and then upward again over the drive roll 48, then rearward in a run 56 to the first element of a belt string and paying out system generally designated 60, and ultimately, as hereinafter more fully described, to the take-up buggy 12.

The improved belt storing and paying out system 60 includes a series of rolls rotating on stationary axes and a series of belt driving and direction reversing devices, also rolls, called a cluster, mounted on a moving carriage and means for controlling and also for effecting movement of the carriage and cluster relative to the rolls which turn on stationary axes. Three stationary rolls 62, 64 and 66 are mounted on the drive buggy for rotation about axes lying on a common plane. Roll 62 is of larger diameter than roll 64, which is disposed between roll 62 and 66, and roll 64 is of larger diameter than roll 66. Three other stationary rolls, 68, 70 and 72 are mounted on the drive buggy for rotation about axes lying on a common plane parallel to the plane of the axes of rolls 62, 64 and 66. The diameters of rolls 68, 70 and 72 are preferably equal to the diameters of rolls 62, 64 and 66 respectively; however, it should be appreciated that this invention contemplates the utilization of rolls of varying and/or unequal diameters.

A movable carriage generally designated 74 is provided with wheels 76, 76a guided by and adapted to roll along guide rails 78 on a frame section 80 of the drive buggy 10. The carriage 74 carries six devices, shown as guide rolls in FIGS. 4 and 5, about which reversals of belt direction are adapted to take place. These guide rolls rotate on axes fixed with respect to the carriage 74, but as the carriage moves longitudinally of the frame section 80 of the drive buggy, the carriage supported rolls approach or move away from the stationary rolls. Provided on the carriage are rolls 82, 84 and 86, mounted for rotation about axes lying in a common plane and three other rolls 88, 90 and 92 mounted for rotation about axes lying in a common plane parallel to the plane of the axes of rolls 82, 84 and 86. Rolls 88, 90 and 92 preferably are equal in diameter to rolls 82, 84 and 86 respectively, and equal in diameter to stationary rolls 62, 64 and 66 respectively. It is to be appreciated, however, that the carriage rolls may be of unequal diameters with respect to each other or with respect to the stationary rolls.

In addition to the active and return runs of the belt 18, there are twelve strands or reaches of belt which have their lengths altered as there occurs relative movement of the carriage 74 along the guide rails 78. These strands are identified as follows:

Strand 56 extends between rolls 48 and 82
Strand 94 extends between rolls 82 and 64
Strand 96 extends between rolls 64 and 86
Strand 98 extends between rolls 86 and 66
Strand 100 extends between rolls 66 and 84
Strand 102 extends between rolls 84 and 62
Strand 104 extends between rolls 62 and 88
Strand 106 extends between rolls 88 and 70
Strand 108 extends between rolls 70 and 92
Strand 110 extends between rolls 92 and 72
Strand 112 extends between rolls 72 and 90, and
Strand 114 extends between rolls 90 and 68.

When the carriage 74 moves from the position shown in FIG. 4 toward the left in that figure, substantially twelve times as much belt length as the distance of carriage movement must be drawn into the belt storing and paying out system, and as such length may be supplied equally by the active and return runs 14 and 16, respectively, the take-up buggy starting from a position at least as far from the drive buggy as six times the length of travel of carriage 74 would have to move six times such distance toward the drive buggy 10 for the carriage to make the movement mentioned. On the other hand, the take-up buggy can move away from the drive buggy six times as far as the carriage 74 moves, if the carriage moves from its remote position to the position shown in FIG. 4.

By providing, in effect two 3 roll clusters, one over the other, the amount of belting required can be stored in a relatively small space with a fairly short carriage travel. Moreover, all the belting required can be stored in the drive section without having to add or remove belting during operation.

The carriage 74 may be caused to move to the right upon the drive buggy 10 by motion of the take-up buggy 12 away from the drive buggy, but return of the take-up buggy toward the drive buggy will not effect the winding in of the slack produced thereby.

Means are provided for winding in such slack and for maintaining necessary tension in the belt system. Such means comprise preferably a single acting hydraulic cylinder generally designated 116 mounted at one side and adjacent the upper portion of the frame section of the drive buggy (FIG. 1), said cylinder including casing 118, a piston 120, and a piston rod 122 (see FIG. 5). Although a single acting hydraulic cylinder is preferably illustrated, it is to be appreciated that the principles of this invention contemplate the use of a double acting or any other suitable cylinder.

With reference to the diagrammatic showing of FIG. 5, a multiple (triple) block 124 is carried on the piston rod 122 and a multiple (double) block 126 is mounted on the head end of cylinder casing 118. A cable 128 is attached at its one end 130 to the rearward end of carriage 74 and extends rearwardly and around a pulley 132 journaled on the frame section 80 of the drive buggy and located at the rearward end thereof (see FIG. 1). From the pulley 132 the cable passes laterally to another pulley 134, and then about pulleys 136 and 138 which offset the cable laterally.

The multiple block 124 has three sheaves, 140, 142 and 144 respectively, rotatably mounted thereon and multiple block 126 has two sheaves 146 and 148 respectively, rotatably mounted thereon. The run of the cable passes forwardly from pulley 138, around sheave 140, then rearwardly and around sheave 146. From the sheave 146 a run extends forwardly to and around sheave 142, then rearwardly to and around sheave 148. After passing sheave 148, the cable extends toward and around sheave 144 and from the latter extends rearwardly and is rigidily secured at its terminal portion 150 to cylinder casing 118.

It should be understood that the stroke of cylinder 116 in fact multiplied by the factor of the cable and cable system must at least equal the required movement in feet of the carriage 74. By way of example, if carriage 74 is required to move 12 feet, then a cylinder having a 12 foot stroke would need no multiplying system. A cylinder having a 6 foot stroke would require a system multiplied by 2; a cylinder having a stroke of 4 feet would require a multiplier of 3, and so on. Applying this principle to the instant device, and with reference to FIG. 5, it will be seen that six runs of cable are provided between pulley 138 and cylinder 116, so that the carriage 74 moves a distance 6 times as great as the stroke of cylinder 116. Although the system or arrangement illustrated in FIG. 5 is preferable for the particular embodiment disclosed, it should be noted that the principles of the present invention envisage any suitable arrangement, such arrangement being dependent on the space available and the economics of design.

Fluid is adapted to be supplied to and exhausted from the cylinder 116 by means of a conduit 152. Fluid may be directed to or exhausted from cylinder 116, either manually or automatically, as set out in detail in Patent No. 2,893,539, hereinbefore referred to. Accordingly, no further illustration or amplification thereof is believed necessary.

The mode of operation of the extensible belt conveyor of the present invention will be described in connection with mining by a method commonly known as block mining in a 3 entry system.

With one continuous miner, a standard extensible belt of the kind shown and described in Patent No. 2,893,539, hereinbefore referred to, and two unitized extensible belts of the present invention, all developments and mining operations including pillar removal may be accomplished.

With reference to FIG. 6, it will be seen that a center entry A and a right entry B have been partially formed in a mineral vein, it being understood that a left entry parallel to the center entry has also been partially formed. Lateral passageways extend between the three entries as indicated at C. A continuous miner M has advanced ahead in the center entry and has rounded a curve into the breakthrough as illustrated in FIG. 6. A pair of unitized extensibles D and E of the type of the present invention, operating as independent portables, i.e. each comprising a drive buggy carrying a take-up buggy, follow the miner in tandem. Extensible D receives disintegrated material from the miner, and while tramming, conveys such material to moving extensible E which in turn discharges onto a take-up buggy F of the kind described in the heretofore mentioned patent.

Miner M advances to form a lateral passageway as indicated by the dotted lines and then rounds a second corner into the right entry as observed in FIG. 7. During this time extensible D continues to follow the miner and functions as a portable while the drive buggy of extensible E remains stationary adjacent the point of initial breakthru to discharge into the take-up F. Of course, during the movement of the miner from the location illustrated in FIG. 6 to that of FIG. 7, the take-up buggy of extensible E was launched in order to follow extensible D. As the miner continues its movement in the direction of the right entry, the take-up buggy of extensible E will be disposed at the junction of the newly formed passageway and the right entry to receive from the drive buggy of extensible D, while the take-up of extensible D follows the miner until it reaches the end of its cut in the right entry. The miner is then retracted to the initial breakthru point and the above cycle is repeated to further develop the center entry and to form a lateral passageway to the left entry. Although the application of the apparatus of this invention has been described in connection with a 3 entry block mining system, its use is not restricted thereto. Because of the ease in which such an apparatus may be handled and transported either in a mine or above the earth's surface, its usage is contemplated in any environment where material is moved from one point to another.

From the foregoing it is apparent that an improved extensible belt conveyor is provided whereby material may be efficiently conveyed from a continuously movable point of reception to a remote point of discharge. By the provision of a means on the drive buggy for carrying a tail buggy, the device of the present invention, when fully retracted, can tram as a portable unit and negotiate corners while concurrently performing its conveying function. Furthermore, such a compact, unitized device enables a miner to start a room off at 90° from a developed entry of passageway without "pre-necking" the room. Also, means are provided for storing all the belting required in the drive buggy.

A preferred embodiment of the principles of this invention having been described and illustrated herein, it is to be realized that modifications thereof can be made without departing from the broad spirit and scope of this invention as defined in the appended claims.

What is claimed is:

1. A conveyor apparatus comprising: a self-propelled drive unit and a self-propelled tail unit relatively movable with respect to each other in a rectilinear path; an endless conveyor belt extending between said units; means carried by said drive unit for drawing in and storing a substantial amount of said belt as said units are moved toward each other and for paying out the stored portion of said belt as said units are moved apart; a launching platform mounted on said drive unit so that said units can be transported as one; said platform being mounted for pivotal movement about a horizontal axis; and means for pivoting said platform about said horizontal axis.

2. A method for establishing a material conveying path comprising: positioning a first mobile carriage on a detached second mobile carriage which carriages support an adjustable endless conveyor belt for orbital movement therebetween; transporting such carriages together as a unit to a given location; moving said first carriage to a position remote from said second carriage; and adjusting said belt in all relative positions of said carriages to permit material to be conveyed thereon.

3. A method for establishing a material conveying path as set forth in claim 2 wherein said adjusting is made substantially simultaneously with said moving.

4. A method for establishing a material conveying path as set forth in claim 2 wherein said positioning is of a self-propelled first mobile carriage on a detached self-propelled second mobile carriage.

5. A method for establishing a material conveying path as set forth in claim 2 wherein said transporting is by said second carriage.

6. A method for establishing a material conveying path as set forth in claim 3 wherein said moving is by said first carriage.

7. A method for establishing a material conveying path as set forth in claim 2 including the additional step of advancing said second carriage substantially simultaneously while moving said first carriage.

8. A method for establishing a material conveying path as set forth in claim 3 wherein said positioning is of a self-propelled first mobile carriage on a detached self-propelled second mobile carriage supporting a storing and paying out means for said conveyor belt; and said adjusting is by said storing and paying out means.

9. A conveyor apparatus comprising: a first mobile carriage; a second mobile carriage detached from said first carriage and selectively locatable on and removable from said first carriage; an endless conveyor belt supported at least in part by said carriages for orbital movement therebetween; and storing and paying out means for said conveyor belt supported by one of said carriages and operative in response to relative movement between said carriages for adjusting said belt between said carriages to permit material to be conveyed thereon.

10. A conveyor apparatus as set forth in claim 9 wherein said first carriage has upper and lower surfaces; said first carriage supports a platform means having at least a portion thereof open in the direction of one end of said first carriage with said portion being positioned adjacent said lower surface; and said second carriage is selectively locatable on said platform means.

11. A conveyor apparatus as set forth in claim 9 wherein said carriages are self-propelled.

12. A conveyor apparatus as set forth in claim 10 wherein said portion of said platform means is vertically moveable to at least adjacent said lower surface.

13. A conveyor apparatus as set forth in claim 12 wherein said first carriage includes means for supporting a portion of said belt; said second carriage includes first means for supporting another portion of said belt; said second carriage includes second means for supporting said storing and paying out means.

References Cited by the Examiner

UNITED STATES PATENTS

| | | | |
|---|---|---|---|
| 2,169,890 | 8/1939 | Zink | 198—139 |
| 2,576,217 | 11/1951 | Eggleston | 198—139 |
| 2,920,747 | 1/1960 | Barrett | 198—139 |
| 3,107,776 | 10/1963 | Long | 198—92 X |
| 3,228,516 | 1/1966 | Sheehan | 198—139 |

EVON C. BLUNK, *Primary Examiner.*

EDWARD A. SROKA, ANDRES H. NIELSEN,
*Examiners.*